Aug. 5, 1958 T. H. CORBETT 2,845,875
PUMPS
Filed March 29, 1956 2 Sheets-Sheet 1
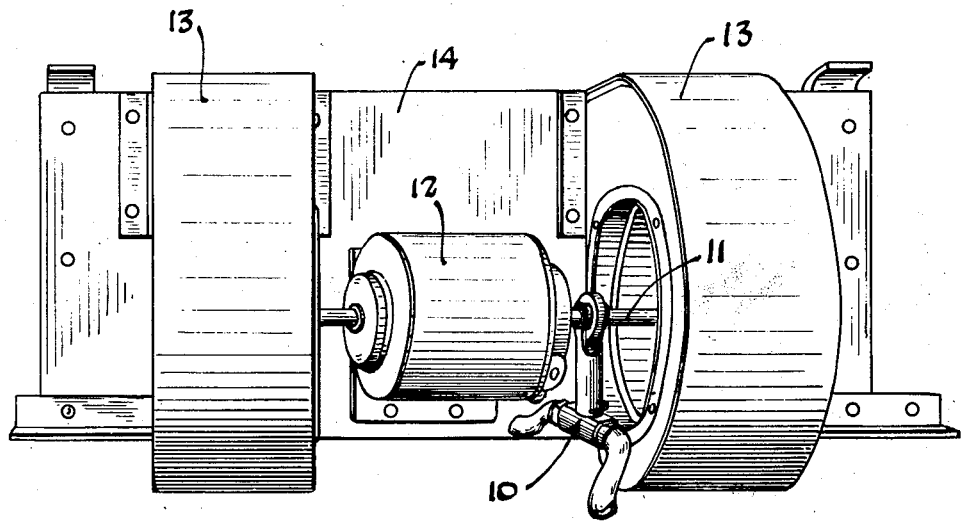
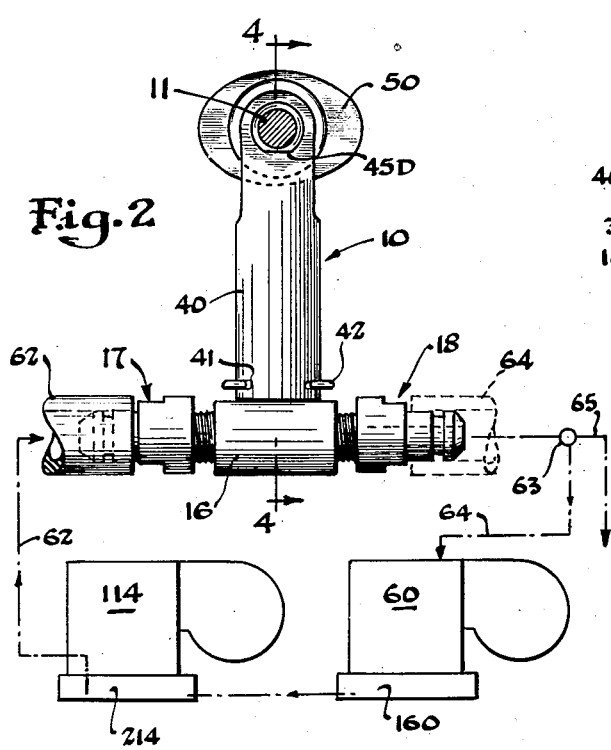
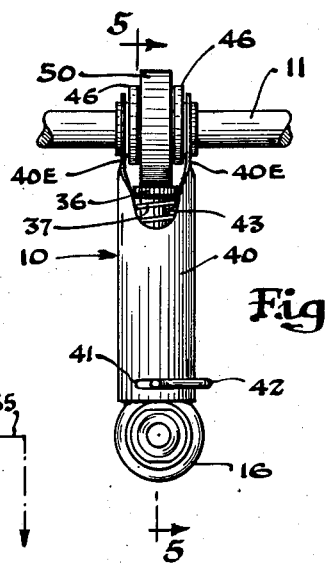
Inventor
Thomas H. Corbett
By Manny Brown & McWilliams
Attorneys

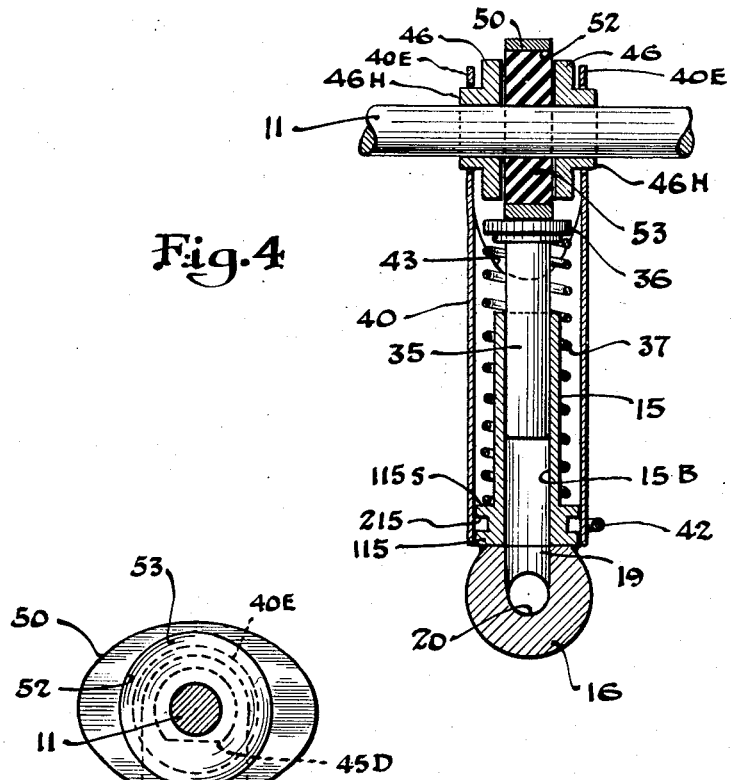

United States Patent Office 2,845,875
Patented Aug. 5, 1958

2,845,875

PUMPS

Thomas H. Corbett, Chicago, Ill.

Application March 29, 1956, Serial No. 574,853

11 Claims. (Cl. 103—153)

This invention relates to pumps and particularly to small-capacity pumps adapted for use in cooling and like systems for pumping condensate.

Wherever cooling systems are employed the disposal of condensate from the evaporator is apt to constitute a serious problem, and the primary object of the present invention is to provide a small-capacity pump adapted for quick and easy association with an operating motor that is used in the system so that the pump will be driven from such operating motor, and a further and related object is to provide such a pump that is small in size and simple and rugged in structure and which is adapted particularly to be mounted and connected in the varying and restricted space that is normally available in various kinds of cooling systems.

A more specific object of the present invention is to provide a small-capacity pump that may be readily put in position on a motor shaft of a cooling system so as to be supported by such shaft and so as to be capable of operation in any position about the shaft, and to have its inlet and outlet connections extended in any desired relationship from the axis of the pump, thus to adapt the pump for mounting and connection in the space that may be available in any particular cooling system in which it is to be used.

Other and further objects of the present invention will be apparent from the following description and claims, and are illustrated in the accompanying drawings, which by way of illustration, show a preferred embodiment of the present invention and the principles thereof, and what I now consider to be the best mode in which I have contemplated applying these principles. Other embodiments of the invention embodying the same or equivalent principles may be used and structural changes may be made as desired by those skilled in the art without departing from the invention.

In the drawings:

Fig. 1 is a rear view of an evaporator unit having the pump of the present invention associated with the shaft of the blower motor of such unit;

Fig. 2 is an enlarged front elevational view of the pump, the pump being shown schematically in association with a cooling system;

Fig. 3 is a side elevational view of the pump;

Fig. 4 is an enlarged cross sectional view taken substantially along the line 4—4 of Fig. 2; and Fig. 5 is an enlarged cross sectional view taken substantially along the line 5—5 of Fig. 3.

For purposes of disclosure the invention is herein illustrated as embodied in a pump 10 that is mounted on the motor shaft 11 of a motor 12 which serves to drive a pair of centrifugal type blowers 13, the impellers of which are connected to opposite ends of the motor shaft 11, and these blowers 13 are effective to circulate air through the coils of an evaporator 14 upon which the motor 12 and the blowers 13 are mounted.

The pump 10 under the present invention, is so constructed and arranged that it may be readily and easily mounted on a shaft such as the shaft 11 either in the original manufacture of the apparatus, or when the apparatus is being installed or serviced. Thus, the pump 11 that is provided is of the piston and cylinder type and has a cylinder 15 that is disposed at right angles to an elongated valve body 16 and this body 16 extends transversely of the cylinder axis and has inlet and outlet valve structures 17 and 18 at its opposite ends. The body 16 has a passage 19 therein which constitutes an axial extension of the bore 15B of the cylinder 15, and the passage 19 intersects with a right angularly related bore 20 that extends longitudinally of the body 16.

At its opposite ends the body 16 is counterbored at 22 coaxially with the bore 20, thus to provide outwardly facing annular seats 23 that are utilized in forming the valve means 17 and 18. Beyond the bores 22, the valve body is provided with axially extending threaded nipples 24 that, in effect, form continuations of the bores 22, and hose fittings 25 are threaded onto the nipples 24. The hose fittings 25 have internally threaded bores 26 therein that are somewhat longer than the nipples 25 and which terminate in annular seats 27, and beyond the seats 27, somewhat smaller axial bores 28 are provided in the fittings 25. With this arrangement, the same parts may be used in providing inlet and outlet valves.

Thus, in respect to the inlet valve means 17, a ball 27V is placed in the bore 26 and against the seat 27 of the left-hand fitting 25, as viewed in Fig. 5, and an expansive coil spring is placed in the bore 22 at this end of the body 16 and the fitting 25 is screwed into position on the left-hand nipple 24. In providing the outlet valve means 18, a similar ball 18V is put in position on the right-hand counterbore 22 and against the seat 23 of this bore, and a spring 30 is placed in the bore 22 outwardly of the ball 18V and the right-hand fitting 25 is screwed into position on the right-hand nipple 24. This serves to provide the outlet valve means 18.

The cylinder 15 has a piston 35 reciprocable therein, and at its upper or outer end, as viewed in Fig. 4, the piston 35 has an enlarged disc-like head 36 formed thereon. The cylinder 15, as will be evident particularly in Figs. 4 and 5, has an enlarged hub or base flange 115 formed near its lower end and this base flange 115 provides an upwardly facing shoulder 115S, as viewed in Fig. 4. The head 36 is of substantially the same diameter as the base flange 115 so that an expansive coil spring 37 may be put into position about the cylinder 15 so as to act between the shoulder 115S and the lower face of the head 36 to urge the piston 35 in an outward direction, or, in other words, through a suction stroke.

Under the present invention, the piston 35 is actuated through its downward or pumping stroke, and the pump is supported in its working position, by means that are adapted for ready association with a driving shaft such as the shaft 11. To this end a cylindrical mounting and supporting sleeve 40 is provided which, at its lower end, is of such a size as to surround the annular outer surface of the base flange 115, and the supporting sleeve 40 is held in association with the base 115 by means which provide for relatively free rotation of the pump cylinder 15 and the valve body 16 about the longitudinal axis of the pump cylinder 15. In accomplishing this, the base flange 115 is provided with an annular groove 215, and the mounting and supporting sleeve 40 has a pair of slots 41 disposed at opposite sides thereof near the lower end of the sleeve 40. These slots 41 provide for entry of the ends of a U-shaped spring retaining member 42 through the slots 41 and into the annular groove 215. Thus the pump cylinder and valve body may be rotated within the supporting and mounting sleeve 40, and yet the pump cylinder 15 is maintained in a predetermined longitudinal position within the supporting sleeve 40.

At its upper end the sleeve 40 is downwardly slotted as at 43 on opposite sides so that intermediate upper portions of the sleeve 40 provide what amounts to mounting ears 40E which are flattened into a parallel relation, and these mounting ears 40E provide for supporting the pump structure on an actuating or driving means such as a shaft 11. In providing for such support, the ears 40E have D-shaped openings 45 formed therein to receive the D-shaped hubs 46H of flanged bearings 46, the hubs 46H being complemental to the D-shaped openings 40E so that the bearings 46 will be held in a non-rotative relationship in the ears 40E. The hubs 46H of the flanged bearings 46 are inserted from what may be termed the inner or adjacent faces of the ears 40E, and between the two bearings 46, an operating cam 50 is located so as to hold the bearings 46 in spaced relation with the hubs 46H thereof operatively engaging the openings 45 of the ears 40E. The operating cam 50, as herein shown, is of the double-lobed type so that upon rotation of the cam 50 through a single cycle, the cam 50 will act on the head 36 to operate the piston 35 through two pumping strokes. The cam 50, under the present invention, is arranged for quick and easy mounting on a shaft such as the shaft 11 and to enable this to be done, the cam is centrally apertured or bored at 52 to a diameter considerably larger than the diameter of the shaft upon which the cam 50 is to be mounted. Within the enlarged central bore 52 a rubber washer 53 is provided, and this rubber washer has an internal diameter somewhat smaller than the diameter of the shaft 11 upon which the cam is to be mounted.

With this arrangement the mounting of the pump on an operating shaft of a cooling system may be accomplished quite easily. Thus, in an evaporator and blower structure such as that shown in Fig. 1, it is only necessary to open up one of the blower casings and to remove one of the impellers from the motor shaft 11. The end of the shaft 11 may then be inserted through the bearings 46 and the center of the rubber member 53, and the entire pump structure may then be moved longitudinally of the shaft until it is in a position where proper clearance space is afforded for the pump. The pump 10 may readily be adapted to the shaft diameter by substitution of bearings 46 and a rubber washer 53 having the required internal size.

When the pump 10 has thus been put in the desired position longitudinally of the shaft, it will be noted that the pump 10 may be extended or located in any position about the axis of the shaft 11, and such a positioning or location of the pump 11 may be chosen by the worker to enable simplicity of the pumping connections to be accomplished. In this regard, it is also important to note that the pump cylinder 15 and the valve body 16 may be rotated about the axis of the cylinder 15 to any desired location, and this further simplifies the installation of the necessary connections to the pump, particularly where this is being done as a service operation.

In Fig. 2 of the drawings the pump 10 is illustrated in diagrammatic association with a cooling system. Thus an evaporator 114 is illustrated as having a sump 214, and a condenser 60 is illustrated as having a sump 160 which may, if desired, serve merely as a drain pan discharging to the sump 214. The inlet valve means 17 are connected by means such as a hose 62 to the sump 214 so that condensate in the sump 214 will be withdrawn by operation of the pump 10. The outlet valve means 18 may be connected by means such as a hose through a valve 63 and a hose 64 to discharge the pump output onto the condenser 60, thus to make this condenser operate as an evaporative condenser; or the valve 63 may be set to discharge the pump output through a hose 65 or other means to a waste connection.

From the foregoing description it will be apparent that the present invention provides a pump that is simple and economical in character and which may be quickly and easily mounted in position on the shaft of an operating motor of a cooling system, and it will also be evident that the pump of the present invention is adapted to have its inlet and discharge connections extended in any direction from the axis of the pump, and the pump may be adjusted about the axis of the drive shaft so as to thereby simplify the installation of the pump.

Thus while I have illustrated and described the invention in a particular embodiment, it will be recognized that changes and variations may be made within the spirit and scope of the invention.

I claim:

1. In a pump, a cylinder having inlet and outlet valves as one end thereof, a piston extended slidably into the other end of said cylinder, spring means acting on said piston to urge said piston to a withdrawn position, a mounting sleeve surrounding said cylinder and rotatably connected to said cylinder in predetermined longitudinal relation, said sleeve being formed at the end remote from said valves with slots on opposite sides thereof to form projecting parallel mounting ears, said ears having aligned bearing openings therein on an axis perpendicular to said cylinder, bearings non-rotatably mounted in aligned relation in the respective ears, a cam disposed between said bearings and having a centrally located resilient ring therein to drivingly embrace a drive shaft extended through said bearings.

2. In a pump, a cylinder having inlet and outlet valves as one end thereof, a piston extended slidably into the other end of said cylinder and having a head on its outer end, a spring surrounding said cylinder and acting against said head to urge said piston to a withdrawn position, a mounting sleeve surrounding said spring and connected to said cylinder in predetermined longitudinal relation, said sleeve being formed with slots on opposite sides thereof to form projecting parallel mounting ears that extend beyond said head, said ears having aligned bearing openings therein on an axis perpendicular to said cylinder, bearings non-rotatably mounted in aligned relation in the respective ears, a cam disposed between said bearings and having a centrally located resilient ring therein to drivingly embrace a drive shaft extended through said bearings.

3. In a pump, a cylinder having inlet and outlet valves as one end thereof, a piston extended slidably into the other end of said cylinder and having a head on its outer end, a spring surrounding said cylinder and acting against said head to urge said piston to a withdrawn position, a hanger connected to said cylinder in predetermined longitudinal relation, said hanger being formed with projecting parallel mounting ears that extend beyond said head, said ears having aligned bearing openings therein on an axis perpendicular to said cylinder, bearings non-rotatably mounted in aligned relation in the respective ears, a cam disposed between said bearings and having a centrally located resilient ring therein to drivingly embrace a drive shaft extended through said bearings.

4. In a pump, a cylinder having inlet and outlet valves as one end thereof, a piston having an inner end extended slidably into the other end of said cylinder and having its outer end located outside of said cylinder, spring means acting against said piston to urge the same to a withdrawn position, a mounting hanger connected to said cylinder in predetermined longitudinal relation and for rotation relative to said cylinder about the axis of the cylinder, said hanger being formed with projecting parallel mounting ears that extend beyond said outer end of said piston, said ears having aligned bearing openings therein on an axis perpendicular to said cylinder, bearings non-rotatably mounted in aligned relation in the respective ears, a cam disposed between said bearings in position to act on said piston and having a centrally located resilient ring therein to drivingly embrace a drive shaft extended through said bearings.

5. In a pump of the character described, a cylinder having inlet and outlet valves at one end thereof, a piston extended slidably into the other end of said cylinder and having a head on its outer end, a spring surrounding said cylinder and acting against said head to urge said piston to a withdrawn position, a mounting sleeve surrounding said spring and connected to said cylinder in predetermined longitudinal relation and for free rotation with respect to the cylinder about the axis of the cylinder, said sleeve having projecting parallel mounting ears that extend beyond said head, said ears having aligned bearing openings therein on an axis perpendicular to said cylinder, bearings replaceably mounted in non-rotatable aligned relation in the respective ears, a cam disposed between said bearings, said cam having a central opening therein and having a resilient ring disposed in said opening and having a central bore to drivingly embrace a drive shaft extended through said bearings.

6. In a pump, a cylinder having inlet and outlet valves as one end thereof, a piston having an inner end extended slidably into the other end of said cylinder and having its outer end located outside of said cylinder, spring means acting against said piston to urge the same to a withdrawn position, a mounting hanger connected to said cylinder in predetermined longitudinal relation and for rotation relative to said cylinder about the axis of the cylinder, said hanger being formed with projecting parallel mounting ears that extend beyond said outer end of said piston, said ears having aligned bearing openings therein on an axis perpendicular to said cylinder, flanged bearings having hubs thereon inserted non-rotatably into said bearing openings in the respective ears from the adjacent faces of the ears, a cam disposed between said bearings in position to act on said piston, said cam having a central opening therein, and a resilient ring in said central opening to drivingly embrace a drive shaft extended through said bearings.

7. In a pump, a cylinder having a transversely extended valve body at one end providing inlet and outlet passages for said cylinder and having inlet and outlet check valves in the respective passages, an enlarged annular hub portion on said cylinder adjacent said valve body and formed to provide an annular securing groove and an annular abutment shoulder facing toward the other end of said cylinder, a piston reciprocable in said cylinder and having one end projecting beyond said other end of the cylinder, a head on said one end of said piston, said head having a diameter substantially equal to the diameter of said hub portion, an expansive coil spring surrounding said cylinder and acting between said shoulder and said head to urge said piston to a withdrawn position, a mounting sleeve surrounding said spring and having one end of the sleeve surrounding said hub portion, means on said sleeve engaging said groove to rotatably relate said cylinder and said sleeve while holding said sleeve in predetermined axial relation on said hub portion, the other end of said sleeve being formed with parallel spaced mounting ears extended from opposite sides thereof, and said ears having non-circular mounting openings therein to receive bearings for supporting the pump on a shaft.

8. In a condensate pump for cooling systems, a cylinder having a transversely extended valve body at one end providing inlet and outlet passages for said cylinder and having inlet and outlet check valves in the respective passages, an enlarged annular hub portion on said cylinder adjacent said valve body and formed to provide an annular securing groove and an annular abutment shoulder facing toward the other end of said cylinder, a piston reciprocable in said cylinder and having one end projecting beyond said other end of the cylinder, a head on said one end of said piston, said head having a diameter substantially equal to the diameter of said hub portion, an expansive coil spring surrounding said cylinder and acting between said shoulder and said head to urge said piston to a withdrawn position, a mounting sleeve surrounding said spring and having one end of the sleeve surrounding said hub portion, means on said sleeve engaging said groove to rotatably relate said cylinder and said sleeve while holding said sleeve in predetermined axial relation on said hub portion, the other end of said sleeve being formed with parallel spaced mounting ears extended from opposite sides thereof, said ears having non-circular mounting openings therein to receive bearings for supporting the pump on a shaft, flanged bearings having complemental non-circular hubs inserted into said mounting opening from the adjacent faces of said ears, and an actuating cam operatively engaging said head and disposed between said bearings to hold said bearings in position in said ears, said cam having a resilient ring therein defining the mounting opening and adapted to snugly embrace a shaft to drivingly connect said cam to such a shaft.

9. In a condensate pump for cooling systems, a cylinder having a transversely extended valve body at one end providing inlet and outlet passages for said cylinder and having inlet and outlet check valves in the respective passages, an enlarged annular hub portion on said cylinder adjacent said valve body and formed to provide an annular securing groove, a piston reciprocable in said cylinder and having an outer end projecting beyond said other end of the cylinder, spring means acting on said piston to urge said piston to a withdrawn position, a mounting hanger having a bearing portion surrounding said hub portion, means on said bearing portion engaging said groove to rotatably relate said cylinder and said hanger while holding said hanger in predetermined axial relation on said hub portion, the other end of said hanger being formed with parallel spaced mounting ears extended from opposite sides thereof, said ears having non-circular mounting openings therein to receive bearings for supporting the pump on a shaft, flanged bearings having complemental non-circular hubs inserted into said mounting opening from the adjacent faces of said ears, and an actuating cam operatively engaging said head and disposed between said bearings to hold said bearings in position in said ears, said cam having a resilient ring therein defining the mounting opening and adapted to snugly embrace a shaft to drivingly connect said cam to such a shaft.

10. In a pump, a cylinder having a transversely extended valve body at one end providing inlet and outlet passages for said cylinder and having inlet and outlet check valves in the respective passages, an enlarged annular hub portion on said cylinder adjacent said valve body and formed to provide an annular securing groove and an annular abutment shoulder facing toward the other end of said cylinder, a piston reciprocable in said cylinder and having one end projecting beyond said other end of the cylinder, a head on said one end of said piston, said head having a diameter substantially equal to the diameter of said hub portion, an expansive coil spring surrounding said cylinder and acting between said shoulder and said head to urge said piston to a withdrawn position, a mounting sleeve surrounding said spring and having one end of the sleeve surrounding said hub portion, means on said sleeve engaging said groove to rotatably relate said cylinder and said sleeve while holding said sleeve in predetermined axial relation on said hub portion, the other end of said sleeve being formed with parallel spaced mounting ears extended from opposite sides thereof, aligned bearings supported in said ears, and cam means disposed between said bearings and said ears for actuating said piston.

11. In a pump of the character described, a drive shaft, a cylinder having inlet and outlet valves at one end thereof, a piston extended slidably into the other end of said cylinder, spring means acting on said piston to urge said piston to a withdrawn position, a hanger having mounting ears at one end thereof and bearings in said ears supporting said hanger on said shaft, means connecting the other end of said hanger to said cylinder in predetermined longitudinal relation with said cylinder radially related to said shaft and for free rotation of said cylinder with respect to the hanger about the axis of the cylinder, and a cam disposed on and driven by said shaft between said bearings for operative engagement with said piston.

References Cited in the file of this patent

UNITED STATES PATENTS

| | | |
|---|---|---|
| 940,751 | Thompson | Nov. 23, 1909 |
| 984,320 | Thompson | Feb. 14, 1911 |
| 1,026,132 | Thompson | May 14, 1912 |
| 2,000,262 | Sutliffe | May 7, 1935 |
| 2,507,879 | Beaudoin | May 16, 1950 |